US 12,182,759 B2

(12) United States Patent
Polo Filisan et al.

(10) Patent No.: US 12,182,759 B2
(45) Date of Patent: Dec. 31, 2024

(54) SENSOR ASSEMBLY FOR EQUIPMENT FOR AIDING THE TRACEABILITY OF AGRI-FOOD PRODUCTS

(71) Applicant: SISSPRE—SOCIETA' ITALIANA SISTEMI E SERVIZI DI PRECISIONE S.R.L., Milan (IT)

(72) Inventors: Andrea Polo Filisan, Milan (IT); Fabio Mario Scalise, Milan (IT)

(73) Assignee: SISSPRE—SOCIETA' ITALIANA SISTEMI E SERVIZI DI PRECISIONE S.R.L., Milan (IT)

(*) Notice: Subject to any disclaimer, the term of this patent is extended or adjusted under 35 U.S.C. 154(b) by 585 days.

(21) Appl. No.: 17/617,240

(22) PCT Filed: Jun. 11, 2020

(86) PCT No.: PCT/IB2020/055489
§ 371 (c)(1),
(2) Date: Dec. 7, 2021

(87) PCT Pub. No.: WO2020/250171
PCT Pub. Date: Dec. 17, 2020

(65) Prior Publication Data
US 2022/0261740 A1    Aug. 18, 2022

(30) Foreign Application Priority Data
Jun. 11, 2019  (IT) .................. 102019000008643

(51) Int. Cl.
G06Q 10/087    (2023.01)
G01G 21/22     (2006.01)
(Continued)

(52) U.S. Cl.
CPC .......... G06Q 10/087 (2013.01); G01G 21/22 (2013.01); G01G 23/00 (2013.01);
(Continued)

(58) Field of Classification Search
CPC ...... G06Q 50/02; G06Q 10/087; G01G 21/22; G01G 23/00; G06K 7/10297; G06K 7/10336
(Continued)

(56) References Cited

U.S. PATENT DOCUMENTS

2009/0026263 A1   1/2009  Schmid et al.
2019/0109904 A1   4/2019  Binder et al.
2019/0171187 A1*  6/2019  Cella ................. G06N 3/126

FOREIGN PATENT DOCUMENTS

CN    109716073 A    5/2019
JP    H02039222 Y   10/1990
(Continued)

OTHER PUBLICATIONS

Green, Peter Michael. A Wireless Sensor Network for In-Crop Sensing. The University of Manchester (United Kingdom) ProQuest Dissertations Publishing, 2014. (Year: 2014).*
(Continued)

Primary Examiner — Florian M Zeender
Assistant Examiner — Fawaad Haider
(74) Attorney, Agent, or Firm — KLINTWORTH & ROZENBLAT IP LLP

(57) ABSTRACT

A sensor assembly for equipment for aiding the traceability of agri-food products includes: a casing having a first face, configured to be coupled to a planar structure, and a second face; a weighing device responding to a load on the second face of the casing, an inclinometer, and an accelerometer configured to supply an acceleration signal indicative of accelerations along an axis perpendicular to the first face of the container. A processing unit detects a measured weight bearing on the weighing device based on load signals supplied by the weighing device, on an inclination signal
(Continued)

supplied by the inclinometer and on the acceleration signal supplied by the accelerometer.

18 Claims, 6 Drawing Sheets

(51) Int. Cl.
  *G01G 23/00* (2006.01)
  *G06K 7/10* (2006.01)
  *G06Q 50/02* (2024.01)

(52) U.S. Cl.
  CPC ..... *G06K 7/10297* (2013.01); *G06K 7/10336* (2013.01); *G06Q 50/02* (2013.01)

(58) Field of Classification Search
  USPC .......................................................... 705/28
  See application file for complete search history.

(56) References Cited

FOREIGN PATENT DOCUMENTS

| JP | H 11-132836 A | 5/1999 |
| JP | 2007-261664 A | 10/2007 |

OTHER PUBLICATIONS

Office action issued in connection with Japanese patent application No. 2021-573761 and machine translation thereof dated Jun. 10, 2024, 12 pages.

Chinese Office Action issued in connection with for Chinese Patent Application No. 202080043435.8 and machine translation thereof dated May 23, 2024, 14 pages.

International Search Report and Written Opinion of the International Searching Authority, dated Aug. 10, 2020, in connection with International Application No. PCT/IB2020/055489 (12 pages).

\* cited by examiner

SENSOR ASSEMBLY FOR EQUIPMENT FOR AIDING THE TRACEABILITY OF AGRI-FOOD PRODUCTS

CROSS-REFERENCE TO RELATED APPLICATIONS

This patent application claims priority from Italian patent application no. 102019000008643 filed on Nov. 6, 2019, the entire disclosure of which is incorporated herein by reference.

TECHNICAL FIELD

The present invention relates to a sensor assembly for equipment for aiding the traceability of agri-food products.

BACKGROUND ART

As is known, the traceability of products along the supply chain is becoming increasingly important in the agri-food sector. On the one hand, in fact, in many countries, traceability is imposed by food safety and hygiene regulations and, on the other, it is above all the interest of companies that make high-quality products to be able to best guarantee the public of the origin of raw materials and the nature of the processes carried out, as well as of their integrity till marketing. Substantially, therefore, there is the need to reduce the room for possible fraud implemented by replacing or adding raw materials of different origin from that declared, the above also for the fundamental protection of the quality-conscious end consumer.

Numerous solutions have therefore been developed with the aim to assist the certification of the origin and processing of marketed products. Generally, however, the initial steps of the chain of traceability of agricultural products, i.e. the collection and transport to the processing site, have a number of weaknesses that make certification difficult and still leave ample room for fraud attempts. This is particularly true, for example, for the harvesting of fruit of any type and for many kinds of vegetables. The difficulties arise from the obvious lack of technological infrastructure at the harvesting sites, which currently prevents operations required for product certification from being carried out.

In addition to protection against fraud, it is also important to trace and document the storage conditions of raw materials. Frequently, in fact, agri-food products are especially sensitive to temperature and humidity, and the organoleptic properties can be irreparably degraded if the storage conditions are not appropriate. Crushing due to the use of too large harvest and/or storage containers can also be a problem. Among other things, it should be noted that, even more than in warehouses, where environmental conditions can be controlled, the risk of damage due to poor storage is greater precisely at the harvesting sites and during transport. For example, harvest containers often remain exposed to the sun for a long time after being filled, because there are no sufficiently large shaded areas at the harvesting sites.

Disclosure of Invention

The object of the present invention is to provide a sensor assembly which allows the limitations described above to be overcome, or at least mitigated.

Therefore, according to the present invention, a sensor assembly for equipment for aiding product traceability is provided substantially as defined in claim 1.

BRIEF DESCRIPTION OF THE DRAWINGS

Further features and advantages of the present invention will be apparent from the following description of non-limiting embodiments thereof, with reference to the figures of the accompanying drawings, wherein.

BEST MODE FOR CARRYING OUT THE INVENTION

Figure 2:
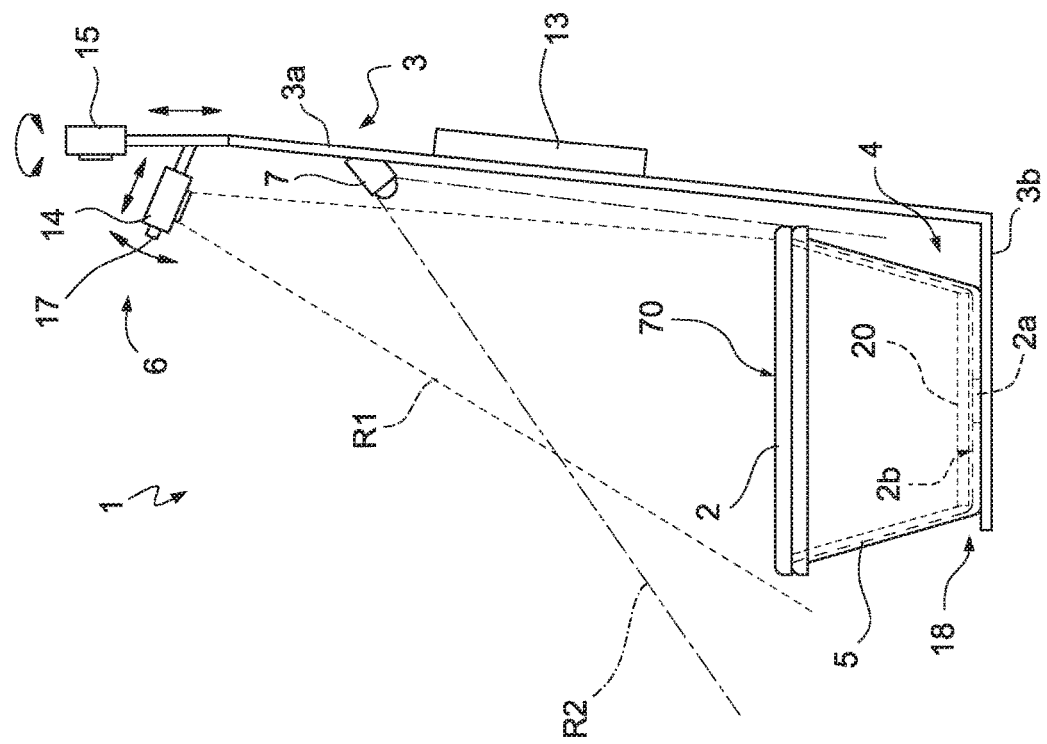
FIG. 2 is a side view of the equipment in FIG. 1.
Figure 1:
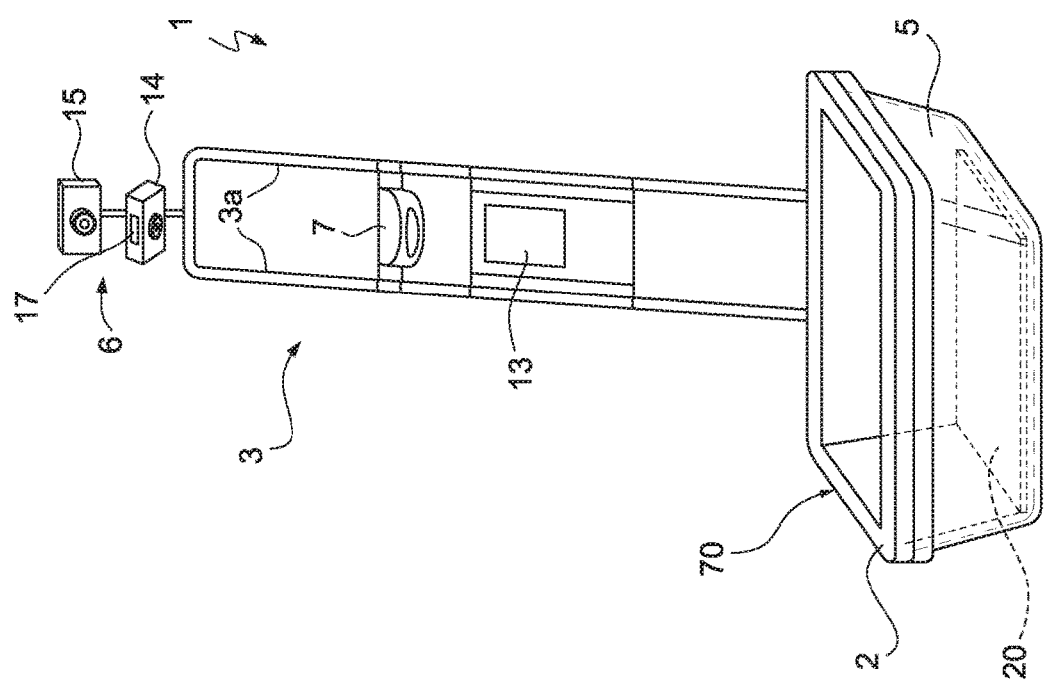
FIG. 1 is a perspective view of an assembly for equipment for aiding the traceability of agri-food products.

With reference to FIGS. 1 and 2, equipment for aiding the traceability of agri-food products is indicated as a whole with the number 1. The equipment 1 is especially intended to support traceability during the harvesting of fruits and vegetables of any kind.

The equipment 1 comprises a container 2 for the harvesting of fruit, and a frame 3 equipped with connecting members 4 for connection to the container 2.

The container 2 may be any container generally open at the top and usable for the harvesting of fruits or vegetables. In the example of FIG. 1, the container 2 is a stackable box that can be stacked on top of other boxes of the same type (generally suitable for containing a few kilos of produce and therefore easily transportable by hand). Alternatively, the container 2 may be a standard box (BIN) suitable for containing larger quantities of produce and movable by forklifts. In one embodiment, the container 2 is provided with an identifier tag 2a, which contains a unique identification code and can be read electromagnetically (for example, an RFID or NFC tag).

In one embodiment, the frame 3 comprises a vertical support 3a defined by one or more uprights attached to the connecting members 4, which are particularly configured to allow the frame 3 to be reversibly coupled to the container 2. In the embodiment of FIG. 1, in particular, the connecting members 4 comprise a base 5 suited to receive the container 2 and attached to a ground-resting portion 3b of the frame 3. In particular, the base 5 may be defined by a stackable box identical to the container 2. In this way, the coupling between the frame 3 and the container 2 is simple and quick and, moreover, the positioning of the container 2 is accurate and reproducible. In one embodiment, not shown, the base may be planar, for example with a substantially horizontal plate for receiving the container 2 resting thereon. Alternatively, the connecting members may comprise vices, pliers or plug or screw fastening systems, and the like.

Figure 3:
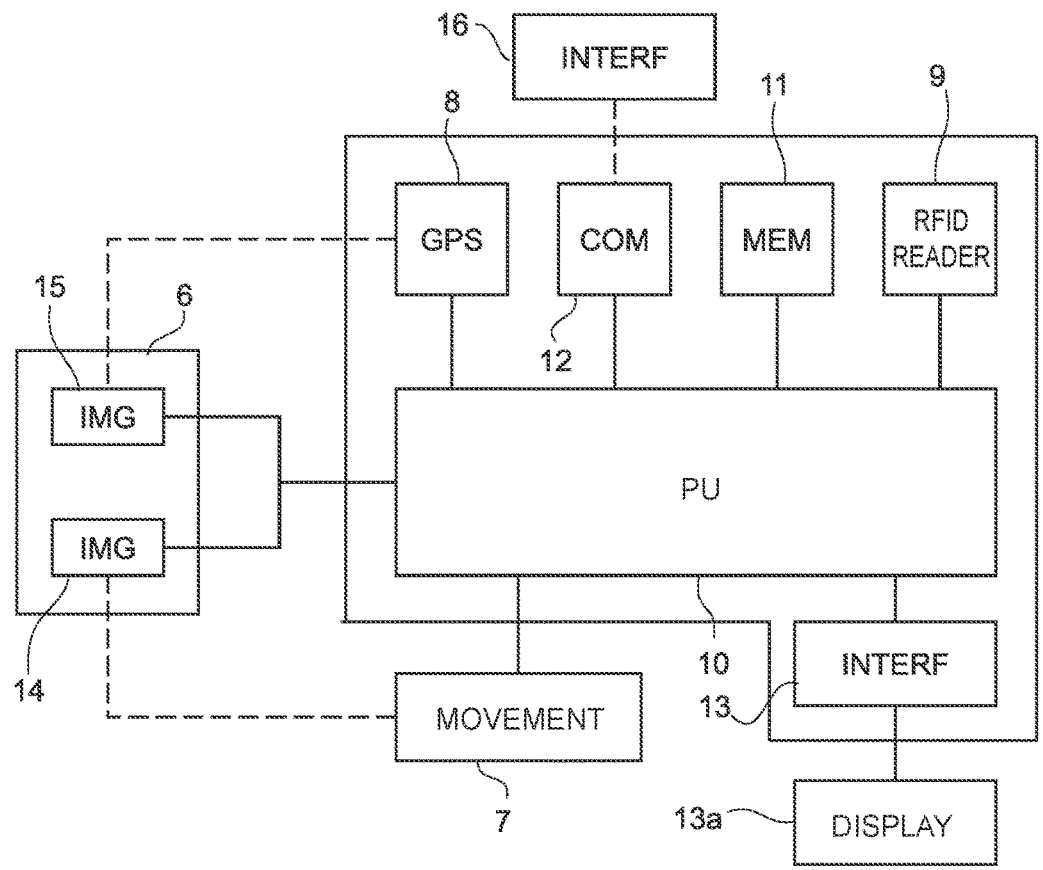
FIG. 3 is a simplified block diagram of the equipment in FIG. 1.

Also with reference to FIG. 3, the equipment 1 further comprises an image detection device 6, a motion sensor 7, a satellite tracking device 8, an identifier tag reader 9, a processing unit 10 equipped with a memory device 11, and a wireless communication module 12, which, in a non-limiting embodiment, are all mounted on the frame 3. A local control interface 13 is equipped with a display 13a and may be supported by the frame 3 and wire-connected to the processing unit 10 or defined by a mobile device, such as a smartphone or tablet, and coupled in communication with the processing unit 10 through the wireless communication module 12, for example by using the Bluetooth communication standard. Alternatively, a remote interface 16 may be coupled in communication with the processing unit 10 for the same purpose through the wireless communication module 12. At least the satellite tracking device 8, the identifier tag reader 9, the processing unit 10, the memory device 11, the wireless communication module 12 and the control interface 13 may be housed within the same casing fixed to the frame 3. In an alternative embodiment, the functions of the satellite tracking device 8, the identifier tag reader 9, the processing unit and the memory device 11 may be integrated into a mobile device (smartphone or tablet).

In one embodiment, the image detection device 6 comprises image sensors 14, 15, provided with respective fixed or variable optical systems, not shown, and an illuminator 17.

The image sensors 14, 15 may be sensors essentially in the visible band, such as CMOS or CCD sensors, or infrared or ultraviolet radiation sensors, laser scanners or, generally, any type suitable to be mounted on the frame 3.

The image sensor 14 is trained on the base 5 so as to frame an observed region R1 including the mouth of the container 2 when the latter is placed in the base 5, as shown in FIG. 2. The image sensor 14 is configured to acquire single images and/or image sequences for a predetermined period of time based on the type of activity to be observed, trace in response to movements detected by the motion sensor 7, and remain in a standby condition in the absence of signals indicative of movements detected by the motion sensor 7. The coupling with the motion sensor 7 may be direct or indirect through the processing unit 10 (FIG. 3). In other words, the image sensor 14 may respond directly to signals from the motion sensor 7 or to commands generated by the processing unit 10, in turn, in response to signals from the motion sensor 7. In one embodiment, image acquisition is performed with a delay, for example of a few seconds, with respect to the instants in which the motion sensor 7 detects a movement or the last of a sequence of movements within its sensitive interval.

Figure 4:
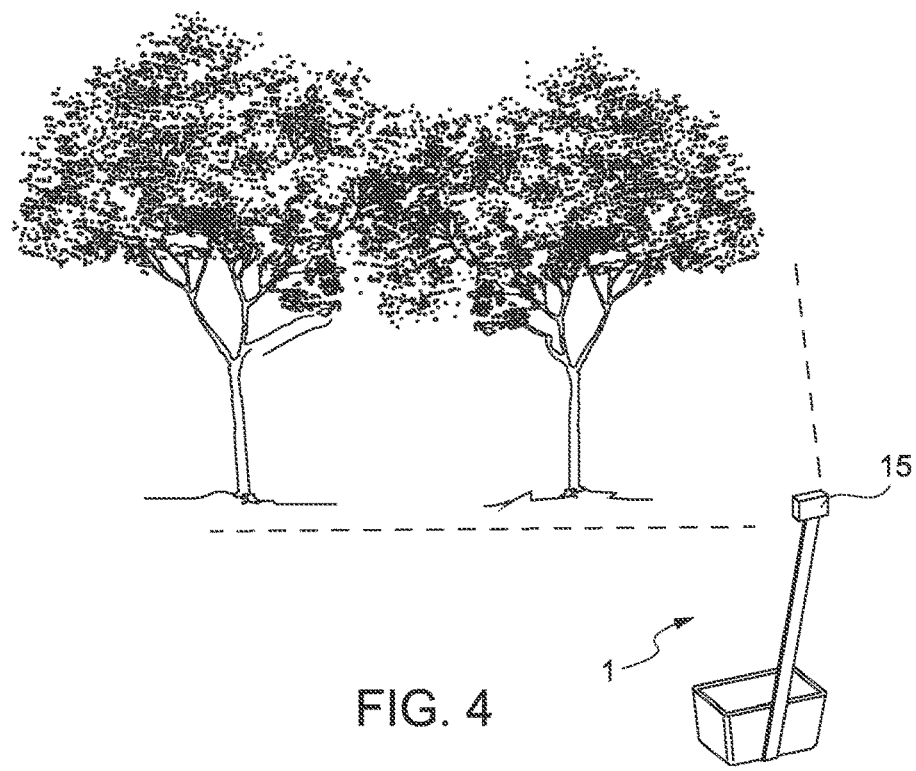
FIG. 4 shows the equipment of FIG. 1 in use.

The image sensor 15 is oriented so as to take panoramic images of a portion of the soil around the equipment 1 where the harvesting is carried out, in particular of trees from which fruits are harvested, as well as installations, fences, portions of buildings and objects possibly present (FIG. 4). The image sensor 15 may be activated manually through commands provided by an operator via the control interface 13 or in response to a change in spatial coordinates indicated by the satellite tracking device 8 (for example, following movements greater than a minimum predetermined distance).

In an alternative embodiment, not shown, it is possible to use a single image sensor that may be oriented both towards the base 5 and the surroundings, and/or variable optical systems that allow manual or automatic switching between the different frames based on a predetermined mode.

The motion sensor 7, for example, may be a passive infrared sensor, a DMT ("Digital Motion Technology") sensor, a microwave sensor, an ultrasound sensor, or combinations thereof. The motion sensor 7 is trained on the base 5 to detect movements in a surveillance region R2 including at least one portion of the observed region R1 framed by the image detection device 6. In particular, the motion sensor 7 is configured so as to be activated by the insertion of the container 2 in the base 5 and by the emptying of harvested fruits into the container 2 already in the base 5. In practice, therefore, the motion sensor 7 allows the introduction of the empty or full container 2 into the base 5, as well as the actions resulting in a change of the contents of the container 2, when the latter is in the base 5, to be determined.

As mentioned, moreover, the motion sensor 7 determines, directly or indirectly through the processing unit 10, the acquisition of images by the image sensor 14.

The satellite tracking device 8, for example, is a GPS tracker or a GNSS navigator and is coupled in communication with the processing unit 10 to provide, in response to a command, a pair of spatial coordinates (longitude and latitude).

The identifier tag reader 9 is of a type suitable for reading the identifier tags 2a exhibited on the container 2. Depending on the identifier tags 2a used, the identifier tag reader 9 may comprise, for example, an RFID reader.

Figure 5:
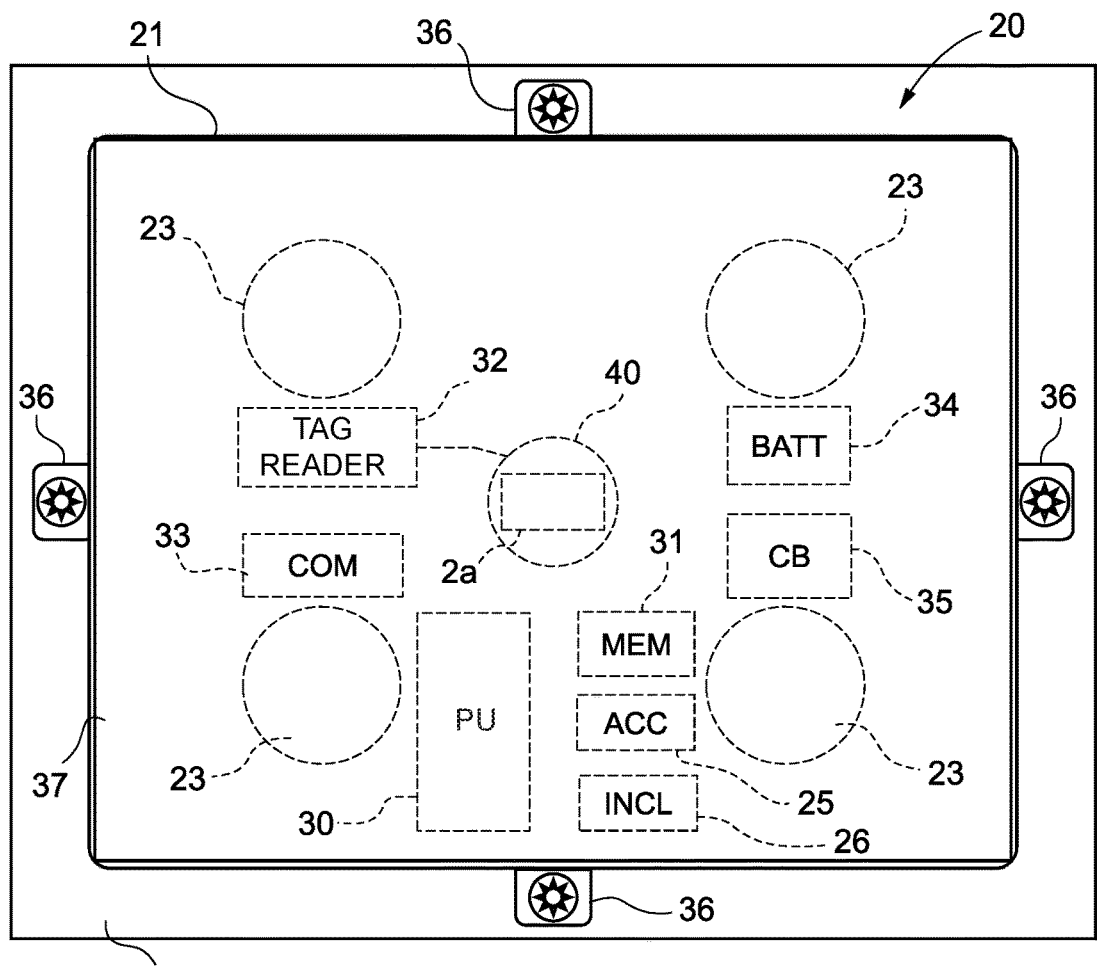
FIG. 5 is a top plan view of a sensor assembly in accordance with one embodiment of the present invention, used in the equipment of FIG. 1.
Figure 6:
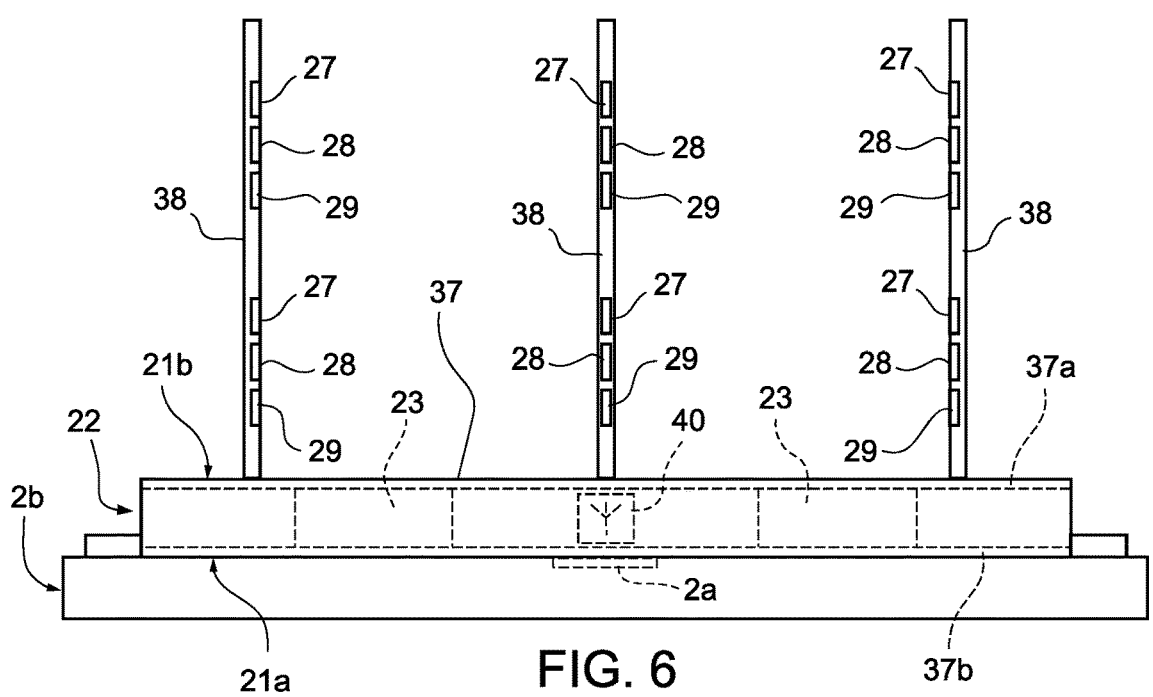
FIG. 6 is a side view of the sensor assembly in FIG. 5.
Figure 7:
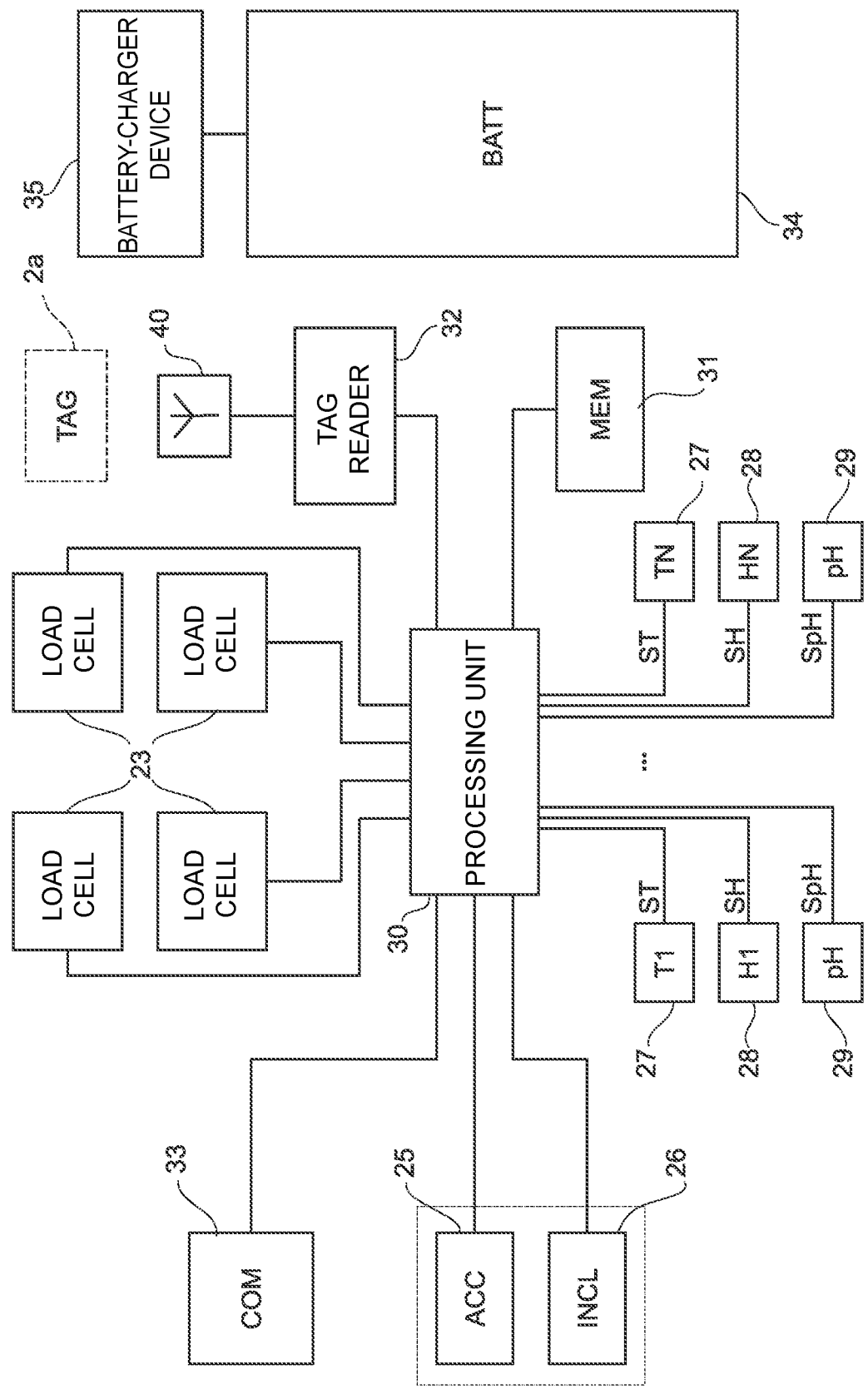
FIG. 7 is a simplified block diagram of the sensor assembly in FIG. 5.

With reference to FIGS. 5-7, the equipment 1 is also equipped with a sensor assembly 20 configured to be removably coupled to the container 2. More precisely, the container 2 and the sensor assembly 20 placed inside the container 2 define an instrument 70 for aiding the traceability that may be used in the equipment 1.

The sensor assembly 20 comprises a casing 21, a weighing device 22 and a plurality of sensors, at least one accelerometer 25, an inclinometer 26, temperature sensors 27, humidity sensors 28, and pH-meters 29. In addition, the sensor assembly comprises an on-board processing unit 30, a memory module 31, an identifier tag reader 32, a communication module 33, a battery 34, and a charger device 35.

The casing 21 has a width and length much greater than the thickness, and for example a quadrangular plan, with a first face 21a and a second face 21b opposite each other. The casing 21 is removably attached to the bottom wall 2b of the container 2 by attach members 36, such as tamper-resistant screws or, in embodiments not shown, double-sided adhesive strips, snap-on elements, and the like. Alternatively, if the container 2 is provided with ventilation holes, the attachment may be obtained by of clamps. In use, the first face 21a faces the bottom wall 2b of the container 2.

The weighing device 22, the accelerometer 25 and the inclinometer 26, as well as the on-board processing unit 30, the memory module 31, the identifier tag reader 32, the communication module 33, the battery 34 and the charger device 35 are housed inside the casing 21.

The weighing device 22 comprises a base plate 37a, a load plate 37b, and one or more load cells 23. The base plate 37a and the load plate 37b, which are rigid and made of a dielectric material, are on the side of the first face 21a and on the side of the second face 21b, respectively, of the casing 21. In one embodiment, the base plate 37a and the load plate 37b may define respective portions of the first face 21a and the second face 21b; alternatively, in an embodiment not shown, the casing may comprise, for example, silicone sheets that cover the base plate and the load plate, thereby sealing the casing and making it waterproof. The load cells 23 are arranged between the base plate 37a and the load plate 37b so as to respond to loads on the load plate 37b and on the second face 21b of the casing 21. It is also understood that the sensor assembly 20 may be reversed. In this case, the base plate acts as a load plate, and vice versa. The number and arrangement of the load cells 23 may be selected based on the design preferences. In the embodiment of FIGS. 5-7, four load cells 23, for example of the piezoelectric type, are arranged in the centre of respective quadrants of the casing 21 and coupled to the base plate 37a and the load plate 37b. The load cells 23 are coupled in communication with the on-board processing unit 30 to provide load signals SW, indicative of the respective load condition of each load cell 23 (FIG. 7). The overall surface of the load plate 37b may be substantially equal to the surface of the bottom wall 2b of the container 2, or smaller.

Figure 8:
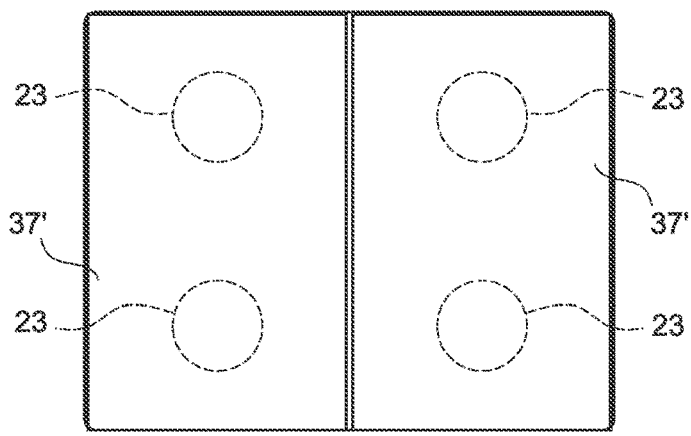
FIGS. 8 and 9 show a first and a second variant, respectively, of a detail of the sensor assembly in FIG. 5.
Figure 9:
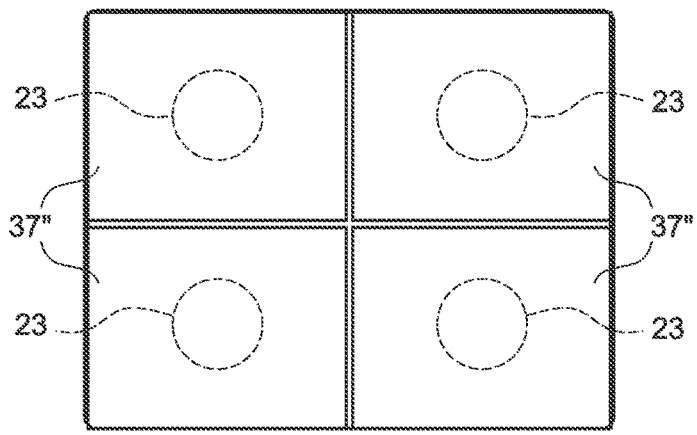

Alternatively, it is possible to use load plates coupled to a set of load cells 23 (for example two load plates 37', each coupled to two load cells 23, as in the embodiment of FIG. 8) or four load plates 37" coupled to respective load cells 23 (FIG. 9). Similarly, multiple base plates may be used in place of the single base plate 37a shown in FIG. 6.

The accelerometer 25 and the inclinometer 26 are also housed inside the casing 21 and, for example, may be of the microelectromechanical type. The accelerometer 25, in particular, is configured to provide an acceleration signal SA indicative of accelerations at least along an axis perpendicular to the first face 21a and the second face 21b of the container 21, and consequently perpendicular to the bottom wall 2b of the container 2 when the casing 21 is attached thereto (in practice, a vertical axis when the container 2 lies flat). In one embodiment, the accelerometer 25 may be multiaxial. In one embodiment, the accelerometer 25 is used by the processing unit 30 as a vibration sensor to activate and deactivate a low-consumption stand-by mode, as explained below.

The inclinometer 26 is rigidly attached to the casing 21 and provides an inclination signal SI indicative of the inclination of a reference plane, and consequently of the casing 21 and the container 2 relative to a horizontal plane. The reference plane is parallel to the first face 21a and the second face 21b of the casing 21. In one embodiment, the inclinometer function may be implemented starting from the continuous component of the acceleration signal SA provided by the accelerometer 25. The function may be completely integrated into the accelerometer 25, if supplied with processing capacity, or implemented by the on-board processing unit 30, which may be configured to extract the continuous component of the acceleration signal SA.

The temperature sensors 27, the humidity sensors 28, and the pH-meters 29 are arranged on flexible rods 38 fixed to the casing 21 and extending perpendicularly to the first face 21a of the casing 21, hence to the bottom wall 2b when the sensor assembly 20 is attached to the container 2. The number and location of the rods 38 and the number and location of the temperature sensors 27, humidity sensors 28 and pH-meters 29 may be selected based on the design preferences. If desired, for example, the temperature sensors 27, the humidity sensors 28, and the pH-meters 29 may also be arranged on the second face 21b of the casing 21. In the non-limiting example of FIGS. 5-7, there are five rods 38, one arranged centrally with respect to the casing 21 and the other in positions corresponding to the load cells 23. Each rod 38 carries two temperature sensors 27, two humidity sensors 28 and two pH-meters 29. The positions of the sensors 27, 28, 29 on the rods 38 may be selected according to the type of product to be collected, as well as the shape and volume of the container 2, so as to obtain the desired accuracy in monitoring environmental variables. The temperature sensors 27, the humidity sensors 28, and the pH-meters 29 provide the processing unit 30 with temperature signals ST, humidity signals SH and pH measurements SpH, respectively.

The on-board processing unit 30 receives and processes the signals supplied by the load cells 23, the accelerometer 25, the inclinometer 26, the temperature sensors 27, the humidity sensors 28 and the pH-meters 29, and communicates with the outside, in particular with the ground processing unit 10, through the communication module 33, as discussed in more detail below. The communication module 33 is configured for connection to an access point of a data network (for example, the wireless communication module 12), and in one embodiment is a BLE (Bluetooth Low Energy) modem or is based on other LPRF (Low Power Radio-Frequency) technologies, advantageously allowing lower energy consumption. In other embodiments, not shown, the communication module may also be selected on the basis of other parameters, such as transmission distance, data flow, latency, noise resistance, according to design preferences.

The identifier tag reader 32 has a coil 40 located in a position corresponding to the identifier tag 2a of the container 2, so that it may be coupled via wireless communication. The identifier tag reader 32 may be an RFID or NFC reader, in accordance with the type of identifier tag 2a used.

In the described embodiment, the battery 34 is of the rechargeable type and supplies electrical power to all users on board the sensor assembly 20.

Figure 10:
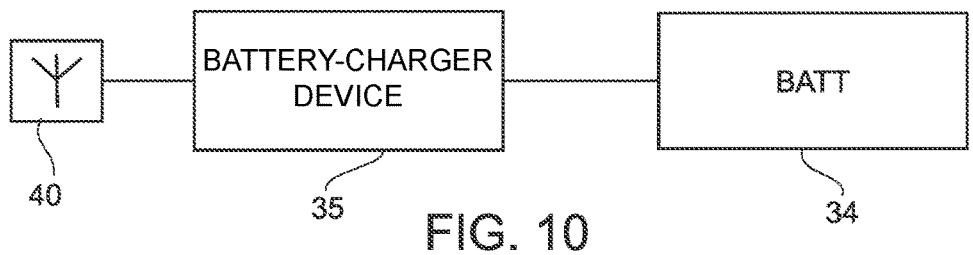
FIGS. 10 and 11 show a first and a second variant, respectively, of a further detail of the sensor assembly in FIG. 5.
Figure 11:
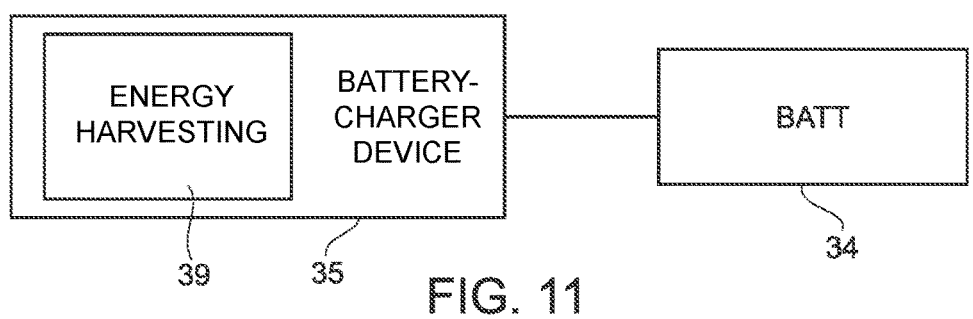

The charger device 35 recharges the battery 34. In the embodiment in FIG. 10, the charger device 34 is of the inductive type and uses the same coil 40 as the identifier tag reader 32. Alternatively, the charger device 35 may comprise a device 39 for recovering energy from the environment (energy harvesting device; FIG. 11) and use, as the source of energy, movement (as the container 2 is subject to continuous loading and unloading operations, it is advantageous to use part of this work to recover energy through the piezoelectric effect) or temperature differences. The charger device may also be equipped with a connector (not shown, for example a USB connector) for connection to an external power source, such as an electrical network.

As mentioned, the on-board processing unit 30 receives and processes the signals supplied by the load cells 23, the accelerometer 25, the inclinometer 26, the temperature sensors 27, the humidity sensors 28 and the pH-meters 29. In particular, the processing unit 30 stores time series of the load signals SW, the acceleration signal SA, the inclination signal SI, the temperature signals ST and the humidity signals SH in the memory module 31 and performs the following operations:

- it activates and deactivates a low-consumption stand-by mode according to the acceleration signal SA provided by the accelerometer 25;
- it determines a measured value W of the weight of the product present in the container 2 starting from the load signals SW provided by the load cells 23, from the acceleration signal SA provided by the accelerometer 25 and from the inclination signal SI provided by the inclinometer 26;
- it stores, at least temporarily, time series of the weight detected, the acceleration signal SA, the inclination signal SI, the temperature signals ST and the humidity signals SH;

it communicates with external devices through the communication module 33, in particular with one or more ground processing units 10 or with a remote server.

Furthermore, in an initialisation step after the coupling of the sensor assembly 20 to the container 2, the processing unit 30, through the identifier tag reader 32, reads the identifier tag 2a of the container 2 and associates it with an own identification code stored in the memory module 31 (in use, the identifier tag 2a is in the range of action of the identifier tag reader 32). In the case of equipment for traceability of agri-food products, this association allows the container 2 and the signals collected by the sensor assembly 20 to be combined together. The processing unit 30 may retrieve from the identifier tag 2a data relating to the construction features of the container 2, such as internal dimensions (bottom wall 2b and depth), maximum load, shape factor, material and other information required by the general management system, such as, for example, type of use, name of the owner company, etc.). Initialisation may thus be carried out fully automatically. Alternatively, the processing unit 30 may be initialised by an operator through a communication interface (not shown), which uses the communication module 33. The operator may associate the identification code of the sensor assembly 20 with the identifier tag 2a of the container 2 and, optionally, load the data relating to the features of the container manually or from a database, for example, residing on a remote server.

The processing unit 30 uses the acceleration signal SA provided by the accelerometer 25 to activate and deactivate the stand-by mode. In practice, the accelerometer 25 is used as a vibration sensor to determine the presence or absence of activity related to the container 2. More precisely, if the acceleration signal SA remains substantially null, or in any case lower than a threshold, for a period of time exceeding a control interval, and in the absence of other signals, the processing unit 30 activates the stand-by mode since the absence of vibrations indicates the absence of significant ongoing activities. When the activity resumes, for example due to a load, the vibrations produced are immediately detected by the accelerometer 25 and the processing unit 30 deactivates the stand-by mode, so that no information is lost during the recording of the weight signals SW.

As regards the calculation of the measured value W of the weight, the processing unit 30 uses a first calculation mode or a second calculation mode based on the acceleration signal SA provided by the accelerometer 25. The first calculation mode is used routinely, whereas the second calculation mode is used following movements, shocks or impacts of the container 2 detected by the accelerometer 25.

Figure 12:
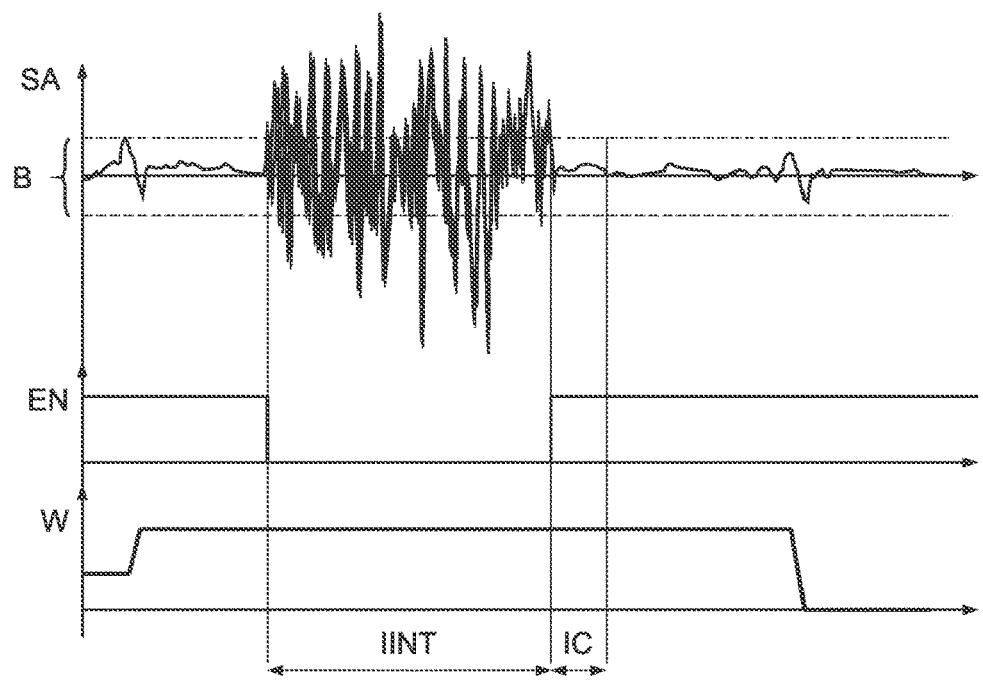
FIG. 12 is a graph illustrating quantities related to the sensor assembly of FIG. 5.

When the acceleration signal SA remains within a control amplitude band B, as shown in FIG. 12, the processing unit 30 sets an enabling signal EN to a first logical value, for example a high logical value, which allows the measured value W of the weight of the product inside the container 2 to be determined and updated according to the first calculation mode based on current values of the load signals SW and the inclination signal SI.

The processing unit 30 combines the data received through the load signals SW, corrected by taking into account the inclination signal SI from the inclinometer 26 so as to compensate for the effect of the inclination of the ground on which the container 2 is located. The combination of the load signals SW is carried out with procedures that may depend on the arrangement of the load cells 23 and on the coupling to the load plates 37b. In the example in FIG. 5, the data extracted from the load signals SW for each load cell 23 may be compensated for the inclination independently, and therefore simply added together to obtain the overall weight. If the surface of the load plate 37b is smaller than the surface of the bottom wall 2b of the container 2, the processing unit 30 determines the weight estimate by using a correction factor, to take into account that the weight measured directly is a fraction of the total weight of the product present in the container 2. The correction factor may be obtained from the initialisation data taken from the identifier tag 2a (in particular from the data relating to the geometrical features) or be entered manually by an authorized operator. In one embodiment, the measured value W of the weight may also be determined by taking into account the humidity rate indicated by the humidity signals SH provided by the humidity sensors 28. Generally, the processing unit 30 may perform statistical processing of all the signals received from the sensors (including, but not limited to, average value, standard deviation, median values, minimum-maximum, variable time windows, gradients, filters, spectral analysis, Fourier analysis) in order to determine the measured value W of the weight and optionally further useful values, such as the time for filling, transporting and unloading the containers 2. In one embodiment, the processing unit 30 associates the stored signals, the measured weight and the information obtained with respective degrees of confidence, precision and tolerances.

When the acceleration signal SA remains outside the control amplitude band B for a time exceeding a predetermined latency interval, the processing unit 30 sets the enabling signal EN to a second logical value, for example a low logical value, and determines the measured value W of the weight based on the second calculation mode. The time interval in which the acceleration signal SA exceeds the control amplitude band B will be hereinafter referred to as the cut-off interval IINT.

In the second calculation mode, the processing unit 30 determines the measured value W starting from values of the acceleration signal SA and the inclination signal SI at least in part temporally not corresponding to the cut-off interval IINT and on the basis of a predetermined criterion. In one embodiment, for example, the measured value W in the cut-off interval IINT is set equal to an average of the measured value W over a control interval IC immediately following the cut-off interval IINT. Alternatively, the measured value W in the cut-off interval IINT may be set equal to the measured value W immediately preceding the cut-off interval IINT (in practice, the measured value W is "frozen" during the cut-off interval IINT) or be obtained by low-pass filtering of the load signals SW. In this way, the load signals SW are deprived of spurious contributions which may be linked to the movement and transport of the container 2, for example between different harvesting sites or between a harvesting site and a storage or processing plant. Nonetheless, any actual changes in weight that occur when the weight detection is disabled may be corrected for later, when the acceleration signal SA returns within the control amplitude band B.

As mentioned previously, the processing unit 30 stores time series of the load signals SW, the acceleration signals SA, the inclination signal SI, the temperature signals ST and the humidity signals SH in the memory module 31. Optionally, a time series of the measured weight values W may also be stored in the memory module 31. All the signals and information stored by the processing unit 30 are associated with timestamps. In this way, in addition to keeping historical records of the detections that may be accessed on request, it is possible to optimize data transmission, to the advantage of the endurance of the sensor assembly 20.

Compared to the monitoring and collection of measurement signals, in fact, data transmission is extremely expensive in terms of energy. Storing the time series of the signals in the memory module 31 prevents wasting energy to establish a connection in the absence of data to be transmitted or for transmissions over long distances. For example, the data stored in the memory module 31 may be sent to the processing unit 10 on the frame 3 through a short-range, low-power connection.

The stored data may be downloaded later, when the network connection becomes available again. Furthermore, also thanks to the timestamps, the collected data may be processed, for example, at a remote server and correlated with further information, such as the images detected by the image sensor 14 or the coordinates detected by the satellite tracking device 8. The correlation of the information, in turn, allows improved product tracing, thus reducing the margin for fraud attempts.

The sensor assembly according to the invention advantageously allows changes in fundamental parameters for the traceability of agri-food products to be monitored, thus reducing the margin for fraud attempts and making available accurate and continuously updated information on the storage conditions. First of all, continuous weight monitoring, associated with the detection of accelerations, allows the events corresponding to actual changes in weight of the product collected in the container to be identified correctly. The ability to communicate wirelessly with low consumption, in addition to making available sufficient endurance for continuous use over long periods, allows the data detected by the sensor assembly to be immediately integrated with the images acquired by the image sensors and geolocation data.

The measurement of temperature and humidity data allows the storage conditions to be monitored both during harvest and transport, and during storage before processing. Exposure to excessive temperatures, potentially harmful changes and inadequate humidity levels may thus be documented for each container. The use of flexible rods allows the temperature and humidity sensors to be positioned in the manner deemed most appropriate, according to the type of container used and the product collected.

The reversible attachment of the sensor assembly to the container offers further advantages in terms of cost, flexibility of use and maintenance. In this way, in fact, the sensor assembly does not need to be integrated into the containers, which, outside the harvesting period, could serve other purposes that do not require constant monitoring of significant parameters. In addition, an event like the breaking of a container does not require the replacement of the whole sensor assembly. Transportation for maintenance or battery recharging is also easier.

The sensor assembly has been described so far in connection with use in containers defined by stackable boxes. However, it is understood that the use of the sensor assembly according to the invention may be extended to any container for the collection of agri-food products. In particular, the sensor assembly may be used, possibly adapted in size, with containers that are standard BIN boxes of the type indicated with 50 in FIG. 13. Each container 50 is equipped with a respective sensor assembly 100 substantially as already described, removably attached to a bottom part 50a inside the container 50. Compared to the sensor assembly 20, the sensor assembly 100 may be distinguished, for example, by:

the number and arrangement of the load cells;
the number, dimensions and arrangement of the load plates associated with the load cells;
the number and arrangement of the temperature and humidity sensors, both with respect to the plane of the casing of the sensor assembly, and in height;
the type of battery and charger device used.

Figure 13:
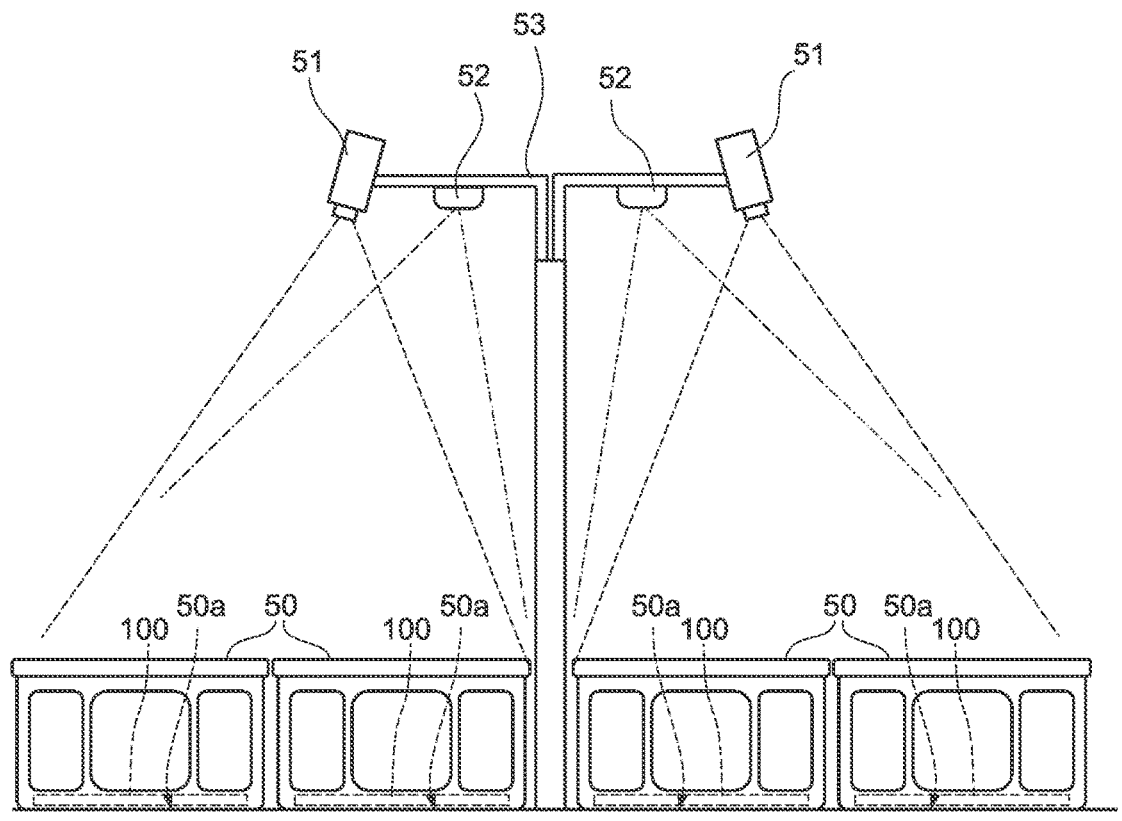
FIG. 13 is a simplified side view of different equipment for aiding the traceability of agri-food products, which uses a sensor assembly in accordance with one embodiment of the present invention.

In this case, the image detection device and the motion sensor, indicated in FIG. 13 with 51 and 52, respectively, may be mounted on a fixed structure 53, adjacent to the place where the containers 50 are arranged (for example, on the loading platform of a means of transport or a trailer, or on the ground in a warehouse of a processing plant). The image detection devices 51 and the motion sensors 52 may each also be associated with several containers 50.

Lastly, it is clear that modifications and variations may be made to the sensor assembly described and claimed herein without however departing from the scope of protection defined by the appended claims.

The invention claimed is:

1. Sensor assembly for equipment for aiding the traceability of agri-food products, comprising:
   a casing having a first face and a second face opposite to one another, the first face being configured to be coupled to a planar structure;
   a weighing device, arranged so as to respond to a load on the second face of the casing;
   an inclinometer, rigidly attached to the casing;
   an accelerometer, rigidly attached to the casing and configured to supply an acceleration signal indicative of accelerations along an axis perpendicular to the first face of the casing;
   a processing unit configured to determine a measured weight bearing on the weighing device based on load signals supplied by the weighing device, on an inclination signal supplied by the inclinometer and on the acceleration signal supplied by the accelerometer; and
   a communication module configured for connection to an access point of a data network, wherein the processing unit is configured to communicate with external devices through the communication module;
   wherein the processing unit is configured to determine the measured weight based on current values of the load signals and the inclination signal, and based on a first calculation mode when the acceleration signal supplied by the accelerometer lies within a control amplitude band, and to determine the measured weight based on values of the load signals and the inclination signal, and based on a second calculation mode; and
   wherein the processing unit is configured to determine the measured weight based on the second calculation mode from values of the acceleration signal and the inclination signal, at least in part temporally not corresponding to a cut-off interval defined by a time interval in which the acceleration signal exceeds the control amplitude band, and to store time series of the load signals, the acceleration signal and the inclination signal, and to associate timestamps with the load signals, the measured weight, the acceleration signal and the inclination signal.

2. The sensor assembly according to claim 1, wherein the weighing device comprises at least a weight sensor, a base plate and a load plate, wherein each weight sensor is arranged between the base plate and the load plate so as to respond to loads on the second face of the casing.

3. The sensor assembly according to claim 2, wherein the second face of the casing is at least in part defined by the at least one load plate.

4. The sensor assembly according to claim 1, comprising, outside the casing, at least one of a temperature sensor, coupled to the processing unit to supply temperature signals, a humidity sensor, coupled to the processing unit to supply humidity signals, and a pH-meter, coupled to the processing unit to supply pH measures.

5. The sensor assembly according to claim 4, comprising a flexible rod, fixed to the casing and extending from the first face of the casing, wherein the at least one of the temperature sensor, the humidity sensor and the pH-meter is arranged on the rod.

6. The sensor assembly according to claim 1, comprising an identifier tag reader, configured for radiofrequency reading identifier tags and coupled to the processing unit.

7. The sensor assembly according to claim 6, wherein the identifier tag reader is an RFID or NFC reader.

8. The sensor assembly according to claim 7, comprising a memory module, wherein the processing unit is configured to read an identifier tag of a container for equipment for aiding the traceability of agri-food products arranged in the range of action of the identifier tag reader, and to associate the identifier tag with an identifier code stored in the memory module.

9. The sensor assembly according to claim 8, wherein the processing unit is configured to receive information relating to geometrical features of the container from the identifier tag through the identifier tag reader.

10. The sensor assembly according to claim 1, comprising a battery and a battery-charger device configured to recharge the battery.

11. The sensor assembly according to claim 10, wherein the battery-charger device is of an inductive type.

12. The sensor assembly according to claim 11, comprising a coil, wherein the identifier tag reader and the battery-charger device are both coupled to the coil.

13. The sensor assembly according to claim 10, wherein the battery-charger device comprises an energy harvesting device.

14. The sensor assembly according to claim 12, wherein the communication module comprises a BLE modem.

15. The sensor assembly according to claim 1, wherein the processing unit is configured to activate and deactivate a low-consumption stand-by mode based on the acceleration signal supplied by the accelerometer.

16. The sensor assembly according to claim 1, comprising reversible attach members configured to removably attach the casing to a planar structure.

17. Equipment for aiding the traceability of agri-food products comprising a container and a sensor assembly according to claim 1 arranged inside the container and removably attached to a bottom wall of the container.

18. Sensor assembly for equipment for aiding the traceability of agri-food products, comprising:
a casing having a first face and a second face opposite to one another, the first face being configured to be coupled to a planar structure;
a weighing device, arranged so as to respond to a load on the second face of the casing;
an inclinometer, rigidly attached to the casing;
an accelerometer, rigidly attached to the casing and configured to supply an acceleration signal indicative of accelerations along an axis perpendicular to the first face of the casing;
a processing unit configured to determine a measured weight bearing on the weighing device based on load signals supplied by the weighing device, on an inclination signal supplied by the inclinometer and on the acceleration signal supplied by the accelerometer;
an identifier tag reader, configured for radiofrequency reading identifier tags and coupled to the processing unit, wherein the identifier tag reader is an RFID or NFC reader;
a memory module; and
a communication module configured for connection to an access point of a data network, wherein the processing unit is configured to communicate with external devices through the communication module;
wherein the processing unit is configured to read an identifier tag of a container for equipment for aiding the traceability of agri-food products arranged in the range of action of the identifier tag reader, to associate the identifier tag with an identifier code stored in the memory module, and to receive information relating to geometrical features of the container from the identifier tag through the identifier tag reader.

* * * * *